United States Patent
Morinaga

(10) Patent No.: US 8,483,976 B2
(45) Date of Patent: Jul. 9, 2013

(54) METHOD FOR ESTIMATING TIRE WEAR AND APPARATUS FOR ESTIMATING TIRE WEAR

(75) Inventor: Hiroshi Morinaga, Kodaira (JP)

(73) Assignee: Kabushiki Kaisha Bridgestone, Tokyo (JP)

( * ) Notice: Subject to any disclaimer, the term of this patent is extended or adjusted under 35 U.S.C. 154(b) by 186 days.

(21) Appl. No.: 13/000,881

(22) PCT Filed: Jun. 25, 2009

(86) PCT No.: PCT/JP2009/061641
§ 371 (c)(1),
(2), (4) Date: Dec. 22, 2010

(87) PCT Pub. No.: WO2009/157516
PCT Pub. Date: Dec. 30, 2009

(65) Prior Publication Data
US 2011/0118989 A1    May 19, 2011

(30) Foreign Application Priority Data
Jun. 25, 2008 (JP) .................. 2008-166344

(51) Int. Cl.
*G01B 3/44* (2006.01)
(52) U.S. Cl.
USPC .................. 702/34; 702/35; 702/75; 702/189
(58) Field of Classification Search
USPC ........................................ 702/34, 35, 75, 189
See application file for complete search history.

(56) References Cited

U.S. PATENT DOCUMENTS

| | | | | |
|---|---|---|---|---|
| 5,557,552 A | * | 9/1996 | Naito et al. ................... | 702/148 |
| 6,704,636 B2 | * | 3/2004 | Amano et al. ................. | 701/80 |
| 2002/0162389 A1 | * | 11/2002 | Yokota et al. ................... | 73/146 |
| 2005/0085987 A1 | * | 4/2005 | Yokota et al. ................... | 701/80 |
| 2005/0257609 A1 | * | 11/2005 | Mancosu et al. ................ | 73/146 |
| 2007/0255510 A1 | * | 11/2007 | Mancosu et al. ................ | 702/34 |
| 2008/0302177 A1 | * | 12/2008 | Sinnett et al. ................... | 73/146 |

FOREIGN PATENT DOCUMENTS

| | | |
|---|---|---|
| JP | 2005-186702 A | 7/2005 |
| JP | 2007-153034 A | 6/2007 |
| JP | 2007-223583 A | 9/2007 |

OTHER PUBLICATIONS

International Search Report issued in PCT/JP2009/061641 dated Sep. 8, 2010.

* cited by examiner

*Primary Examiner* — Elias Desta
(74) *Attorney, Agent, or Firm* — Sughrue Mion, PLLC

(57) ABSTRACT

The degree of tire wear is estimated with constancy and accuracy even when the road surface becomes rough during a vehicular run. The deformation speeds $V_{tf}$ and $V_{tk}$ of the tread of the tire are obtained respectively by calculating the levels of peaks $P_f$ and $P_k$ at contact edges appearing in the differentiated waveform of radial acceleration detected by an acceleration sensor 11 installed on the inner surface in the inner liner region of the tire. An average standardized deformation velocity $V'''_t$ is calculated as the average of the absolute values of leading-edge-side standardized deformation speed $V'''_{tf}$ and trailing-edge-side standardized deformation speed $V'''_{tk}$, which are obtained by standardizing the $V_{tf}$ and $V_{tk}$ using the rotation time $T_r$ of the tire. At the same time, an extra-contact-patch vibration level v of the tread is detected from the radial acceleration having passed through a bandpass filter 16. And a degree M of tire wear is estimated, using the average standardized deformation speed $V'''_t$, the extra-contact-patch vibration level v, and a map 18M.

8 Claims, 15 Drawing Sheets

METHOD FOR ESTIMATING TIRE WEAR AND APPARATUS FOR ESTIMATING TIRE WEAR

TECHNICAL FIELD

The present invention relates to a method for estimating the degree of wear of a tire and an apparatus therefor.

BACKGROUND ART

Generally tire wear leads to lowered draining performance and longer braking distance on wet road surfaces. Also, in the case of winter tires, wear can bring about a marked drop in grip performance on an icy or snow-covered road. Furthermore, excessive wear can cause water to seep into the tread belts. Also, with small vehicles, when the remaining groove depth of a tire is reduced to 1.6 mm, a rubber projection called a "slip sign" makes its appearance in the tire groove. To ensure running safety of a vehicle, tires should be replaced before the appearance of the slip sign, but there are, in fact, not a few drivers who are least interested in such maintenance practice.

Thus, there is demand for technologies for automatically detecting wear of tires to warn the driver of the state. Also, in the light of vehicular control, it is desired that control for greater safety be realized through the grasp of changes in tire characteristics resulting from wear.

In a conventional method for estimating wear of a tire, the absolute speed of a vehicle is calculated using GPS, an optical sensor, or the like, then the dynamic radius of the tire is calculated by comparing it with the rotational speed of the wheel, and the amount of tire wear is derived from the difference between the dynamic radius of the tire and the radius of the tire when it is new (refer to Patent Documents 1 and 3, for example).

However, even for a completely worn tire, the difference in rotational speed between the worn tire and the new tire is about 1% at most. It has therefore been difficult to achieve a constantly accurate estimation of tire wear from the difference in tire radius because of the necessity not only to measure with great accuracy but also to take into consideration various error factors in vehicular running, such as the inner-outer wheel errors in cornering, errors due to acceleration slips at braking or driving, and errors due to inclinations on the road surface.

Also, there have been other methods proposed for estimating tire wear, in which a transponder or an IC tag is embedded in the tire tread together with a receiver installed on the vehicle body in order to estimate tire wear using the loss of response as the transponder or the IC tag is broken or falls off when the tire is worn (refer to Patent Documents 3 to 5, for example), or a detector consisting of a magnetic material or a conductive rubber is embedded in the tire tread together with a sensor installed on the vehicle body in order to estimate tire wear by detecting the change in the signals detected by the sensor as the detector wears off as a result of tire wear (refer to Patent Documents 6 and 7, for example).

However, the methods using a transponder or IC tag or a magnetic material or conductive rubber embedded in the tire tread have not only the problem of adverse effects on the durability of the tire when the detector or sensor is exposed in the contact patch with the progress of wear but also the problem of lowered grip force of the tire when the rubber whose physical properties are different from those of the tread rubber is exposed on the surface of the tire tread.

Also, there has been a disclosure of technological thought, in which a strain sensor for detecting a strain of a tire in the circumferential direction is disposed to measure the state of tire wear from the waveform of strain outputted by the strain sensor. The fact of the matter, though, is that there has been no disclosure of the concrete structure thereof (refer to Patent Document 8, for example). Moreover, the invention disclosed in this document specifies a low-speed domain of 10 km/h or below, for instance, as preferred. As such, the measurement can only be made in nearly static conditions, and so it suffers from the drawback of inability to measure the state of wear during running at high speeds or on a rough road, for instance.

In this connection, the present applicant proposed a method for estimating the degree of tire wear using an index of deformation speed in the tire radial direction at the contact edge of the tire tread (WO2009008502). In this method, an acceleration sensor is installed in the inner liner region of a tire, and a radial acceleration of the tire is detected. Then a temporally-differentiated waveform thereof is calculated, and differential peak values, which are the magnitude of peaks appearing in the calculated differentiated waveform of radial acceleration, are calculated so as to use them as the index of deformation speed. And the degree of wear of the tire is estimated using the index of deformation speed and a predetermined relationship between the index of deformation speed and the degree of tire wear. Thus, the wear of a tire can be estimated with excellent accuracy irrespective of differences in wear mode.

Prior Art Document

Patent Document

Patent Document 1: Japanese Unexamined Patent Application Publication No. 6-278419

Patent Document 2: Japanese Unexamined Patent Application Publication No. 7-164830

Patent Document 3: Japanese Unexamined Patent Application Publication No. 10-307981

Patent Document 4: Japanese Unexamined Patent Application Publication No. 2004-205437

Patent Document 5: US2002/0116992A1

Patent Document 6: Japanese Unexamined Patent Application Publication No. 2003-214808

Patent Document 7: Japanese Unexamined Patent Application Publication No. 2005-28950

Patent Document 8: Japanese Unexamined Patent Application Publication No. 2007-153034

DISCLOSURE OF THE INVENTION

Problems to be Solved by the Invention

The inventor has conducted further investigation into the above-cited method for estimating the degree of tire wear using the index of deformation speed. And he has eventually found a problem point of the proposed method which is lowered estimation accuracy of the degree of wear resulting from smaller differential peak values, which serve as the index of deformation speed, when the roughness of the road surface increases during a vehicular run.

The present invention has been made in view of the above-mentioned problem, and an object thereof is to provide a method and apparatus for estimating the degree of wear of a tire with constancy and accuracy even when the roughness of the road surface increases during a vehicular run.

Means for Solving the Problem

FIG. 12 is a schematic illustration showing a profile of a tire diformed by the application of a load thereon. As a load is applied to the tire, the part of tire in contact with the road surface (contact patch or footprint) is pushed in toward the tire center, and the regions of the tire near it are so deformed as to bulge out from the initial profile shown by a dashed-dotted line in the figure. Here the point outside the contact patch where the tire 1 bulges outmost is defined by the term "bulge point(s)", and the edge(s) of the contact patch of the tire 1 by the term "contact edge(s)".

Through investigation into the differences in deformation between new tires and worn tires, the inventor has come to realize that for the same amount of deflection given, worn tires show greater deformation speed of the tread in the radial direction at contact edges, namely, the leading edge and the trailing edge of contact patch, than new tires. The reason is presumably that the rigidity against the out-of-plane bending deformation of the tread declines due to the reduction in tread rubber of worn tires. Also, the inventor has found that the deformation speed is under the influence of the road surface roughness during a vehicular run. More specifically, the higher the level of vibration inputted to the acceleration sensor due to an increase of road surface roughness, the lower the deformation speed of the tread will be. This is presumably because the vibration occurring at the contact patch, or especially at the contact edges, lowers the deformation speed. However, as comparisons on the same road surface show, there remains the difference in deformation speed between new tires and worn tires. Thus, the deformation speed may be used as a measure for estimating the degree of tire wear, and at the same time, the deformation speed or the degree of tire wear may be corrected based on information on the tread vibration level at a specific position and in a specific frequency range, which changes with road surface roughness. And this realization has led to the present invention that can accomplish the estimation of the state of tire wear with excellent accuracy and constancy.

Thus, according to a first aspect of the present invention, there is provided a method for estimating the wear of a tire comprising: detecting a radial acceleration of the tire with an acceleration sensor disposed on an inner surface side of a tire tread, calculating a standardized deformation speed in a radial direction of the tire at a contact edge of the tire tread from the radial acceleration of the tire, calculating a tread vibration level at a specific position and in a specific frequency range from the radial acceleration of the tire, the tread vibration level changing with road surface roughness in a portion outside a contact patch (extra-contact-patch portion) of the tire tread, correcting the standardized deformation speed based on the tread vibration level, and estimating a degree of tire wear based on the corrected standardized deformation speed.

According to a second aspect of the present invention, there is provided a method for estimating the wear of a tire comprising: detecting a radial acceleration of the tire with an acceleration sensor disposed on an inner surface side of a tire tread, calculating a standardized deformation speed in a radial direction of the tire at a contact edge of the tire tread from the radial acceleration of the tire, calculating a tread vibration level at a specific position and in a specific frequency range from the radial acceleration of the tire, the tread vibration level changing with road surface roughness in a portion outside a contact patch of the tire tread, and correcting a degree of tire wear estimated from the standardized deformation speed, based on the tread vibration level.

According to a third aspect of the present invention, there is provided a method for estimating the wear of a tire, in which the specific frequency range is selected from a range of 10 to 2000 Hz out of frequency components of the tread vibration.

According to a fourth aspect of the present invention, there is provided a method for estimating the wear of a tire, in which the portion outside the contact patch is selected from a range of 30% or less of tire circumferential length along the tire circumference from a contact edge.

According to a fifth aspect of the present invention, there is provided a method for estimating the wear of a tire, which further comprises passing signals outputted from the acceleration sensor through a bandpass filter, which extracts signals in the specific frequency range, and then calculating the tread vibration level from the signals having passed through the bandpass filter.

According to a sixth aspect of the present invention, there is provided a method for estimating the wear of a tire, in which the tread vibration level is corrected using a wheel speed or a tire rotation time.

According to a seventh aspect of the present invention, there is provided a method for estimating the wear of a tire, in which a degree of wear is estimated only when the tread vibration level is within a predetermined range.

According to an eighth aspect of the present invention, there is provided an apparatus for estimating wear of a tire which includes an acceleration sensor disposed on an inner surface side of a tire tread for detecting a radial acceleration of the tire, a means for calculating a standardized deformation speed in a radial direction of the tire at a contact edge of a tire tread from the detected radial acceleration of the tire, a means for calculating a tread vibration level from the detected radial acceleration of the tire, a means for correcting the calculated standardized deformation speed based on the detected tread vibration level, and a means for estimating a degree of tire wear based on the corrected standardized deformation speed.

Effect of the Invention

In a method for estimating tire wear according to the present invention, a standardized deformation speed of a tire tread measured by an acceleration sensor is used as a measure for estimating the degree of tire wear, and at the same time, a tread vibration level at a specific position and in a specific frequency range, which changes with road surface roughness in a portion outside a contact patch (extra-contact-patch portion) of the tire tread, is calculated from the signals outputted from the acceleration sensor. Then a standardized deformation speed is corrected based on the calculated vibration level, and a degree of tire wear is estimated based on the corrected standardized deformation speed, or a degree of tire wear estimated from the standardized deformation speed of the tire tread measured by the acceleration sensor is corrected based on the calculated vibration level. Therefore, the state of tire wear can be estimated with accuracy and constancy however the condition of road surface is and even when he vehicular speed changes. Also, since the acceleration sensor is disposed on the inner surface side of the tire tread, the durability of the sensor and the tire can be improved markedly compared with the conventional arrangement in which a transponder or an IC tag is embedded in the tire tread. As for the position for installing the acceleration sensor, the inner liner region is preferable from the viewpoint of durability. Also, the axial center of tire cross section is preferable from the viewpoint of data stability.

In addition, the signals of radial acceleration of the tire are used as the signals of the acceleration sensor. Therefore, the standardized deformation speed at the contact edges and the vibration level at a specific position in a portion outside the contact patch and in a specific frequency range can be measured with excellent accuracy. In this arrangement, the differential peak values, which are the magnitude of the peaks of the temporally-differentiated waveform derived by temporally differentiating the signals of radial acceleration, or the slopes of the radial acceleration waveform at the contact edges, when the peak positions are assumed to be at the contact edges of the tire, are used as the deformation speed.

And the standardized deformation speed is a standardized version of the deformation speed. That is, the level of acceleration waveform is subject to great variation in relation to the speed, so that the level of the differential peak values will also be subject to variation as a natural outcome. Hence, the deformation speed must be standardized if the measurement is to be performed with constancy. And since the acceleration level is approximately proportional to the square of the speed, division of the acceleration by the square of speed or the multiplication of it by the square of rotation time will make the variation due to speed negligible, thus making the deformation speed usable as the index of deformation.

However, when calculating the deformation speed, the time for one revolution (period) will also change. Therefore, the deformation speed can be used as a substantially stable index of deformation if the differential peak value of acceleration is divided by the cube of speed or multiplied by the cube of rotation time.

Also, the tread vibration within the contact patch is suppressed due to a restraint from the road surface, but the tread vibration in the portion outside the contact patch, where it is subject to little damping, reflects road surface roughness and shows a high correlation with the standardized deformation speed. In the present invention, the vibration level in the portion outside the contact patch (extra-contact-patch vibration level) is used in correcting the standardized deformation speed, thus making it possible to correct the standardized deformation speed properly.

Also, out of the tread vibration components in the portion outside the contact patch, the vibration level in the specific frequency range within 10 to 2000 Hz has a high correlation with the standardized deformation speed, so that it can be suitably used in correcting the standardized deformation speed.

Also, the detection accuracy of vibration level will decline if data from positions far apart from the road surface are included. Therefore, the extra-contact-patch portion is selected from the range of 30% or less of tire circumferential length from the contact edge, thereby obtaining the vibration level corresponding to the road surface roughness with accuracy.

Also, the vibration level of the tread is calculated from the signals of radial acceleration having passed through a bandpass filter for extracting the specific frequency range, so that the vibration level in the specific frequency range can be calculated efficiently with reduced computation load.

Also, the vibration level of specific tread vibration which changes with the calculated road surface roughness has a high speed dependency. Therefore, the detection accuracy of the vibration level will improve if it is corrected using the wheel speed or tire rotation time. More specifically, it is preferable that the vibration level is corrected using a square value of wheel speed or a square value of tire rotation time as in the above-described standardization of the deformation speed.

Also, the degree of wear is estimated only when the calculated vibration level is within a specific range, so that erroneous detections of the degree of wear can be avoided even when the road surface is extremely rough, for instance.

Also, the use of a tire wear estimation apparatus as in the eighth aspect of the present invention will ensure a reliable implementation of the above-described tire wear estimating method, thus realizing an accurate estimation of the degree of tire wear irrespective of the condition of the road on which the vehicle is running.

BEST MODE FOR CARRYING OUT THE INVENTION

Preferred embodiments of the present invention will be described hereinbelow with reference to the accompanying drawings.

Figure 1:
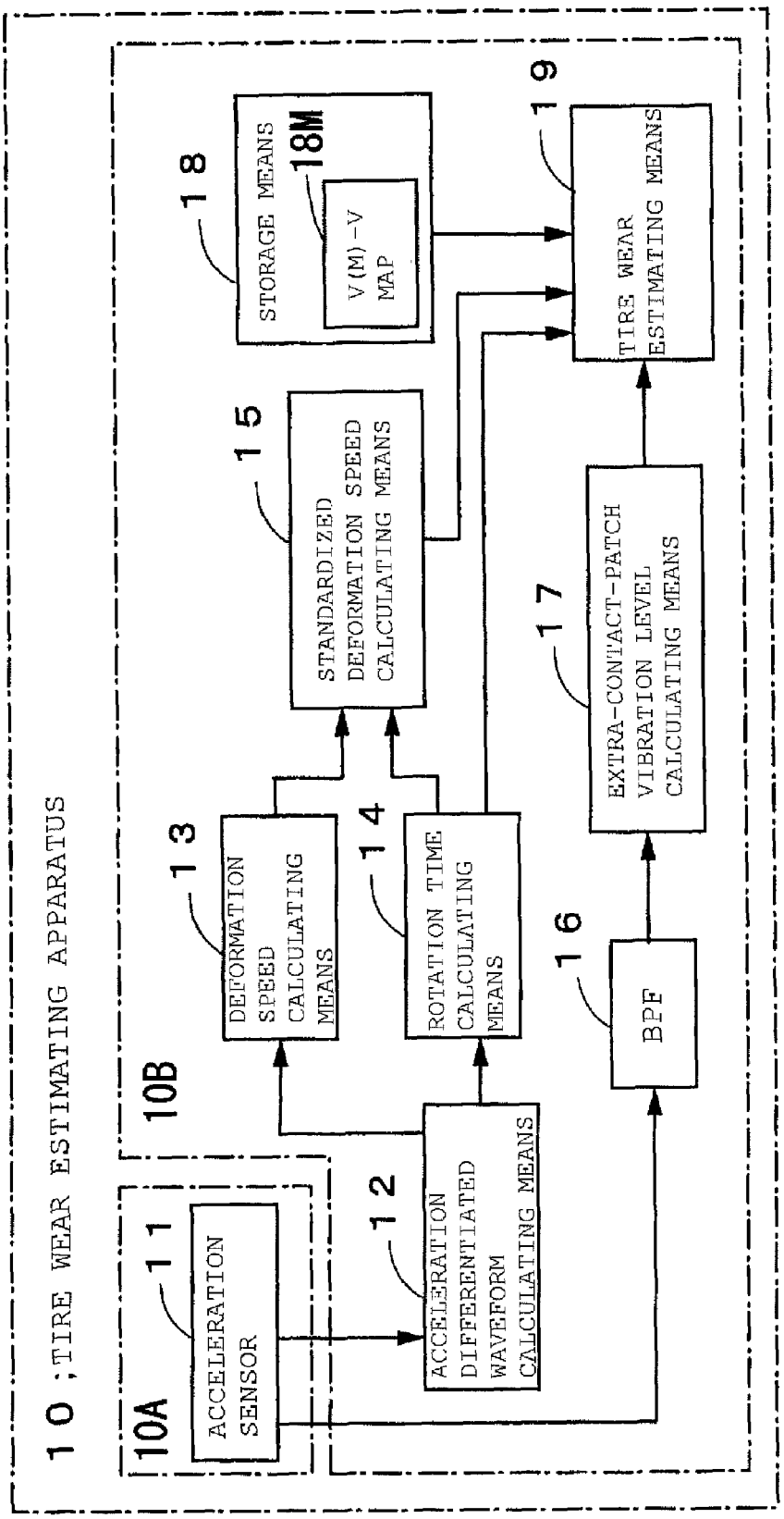
FIG. 1 is a functional block diagram showing a structure of a tire wear estimating apparatus according to a preferred embodiment of the present invention.

FIG. 1 is a block diagram showing a structure of a tire wear estimating apparatus 10 according to a preferred embodiment of the present invention. In the figure, reference numeral 11 denotes an acceleration sensor, 12 an acceleration differentiated waveform calculating means, 13 a deformation speed calculating means, 14 a rotation time calculating means, 15 a standardized deformation speed calculating means, 16 a bandpass filter, 17 an extra-contact-patch vibration level calculating means, 18 a storage means, and 19 a tire wear estimating means.

The acceleration sensor 11 is a sensor for detecting the acceleration of the inner surface of a tire tread. This acceleration sensor 11 constitutes a sensor section 10A of the tire wear estimating apparatus 10 of the present invention, whereas the respective means from the acceleration differentiated waveform calculating means to the tire wear estimating means constitute a calculating section 10B thereof.

Figure 2:
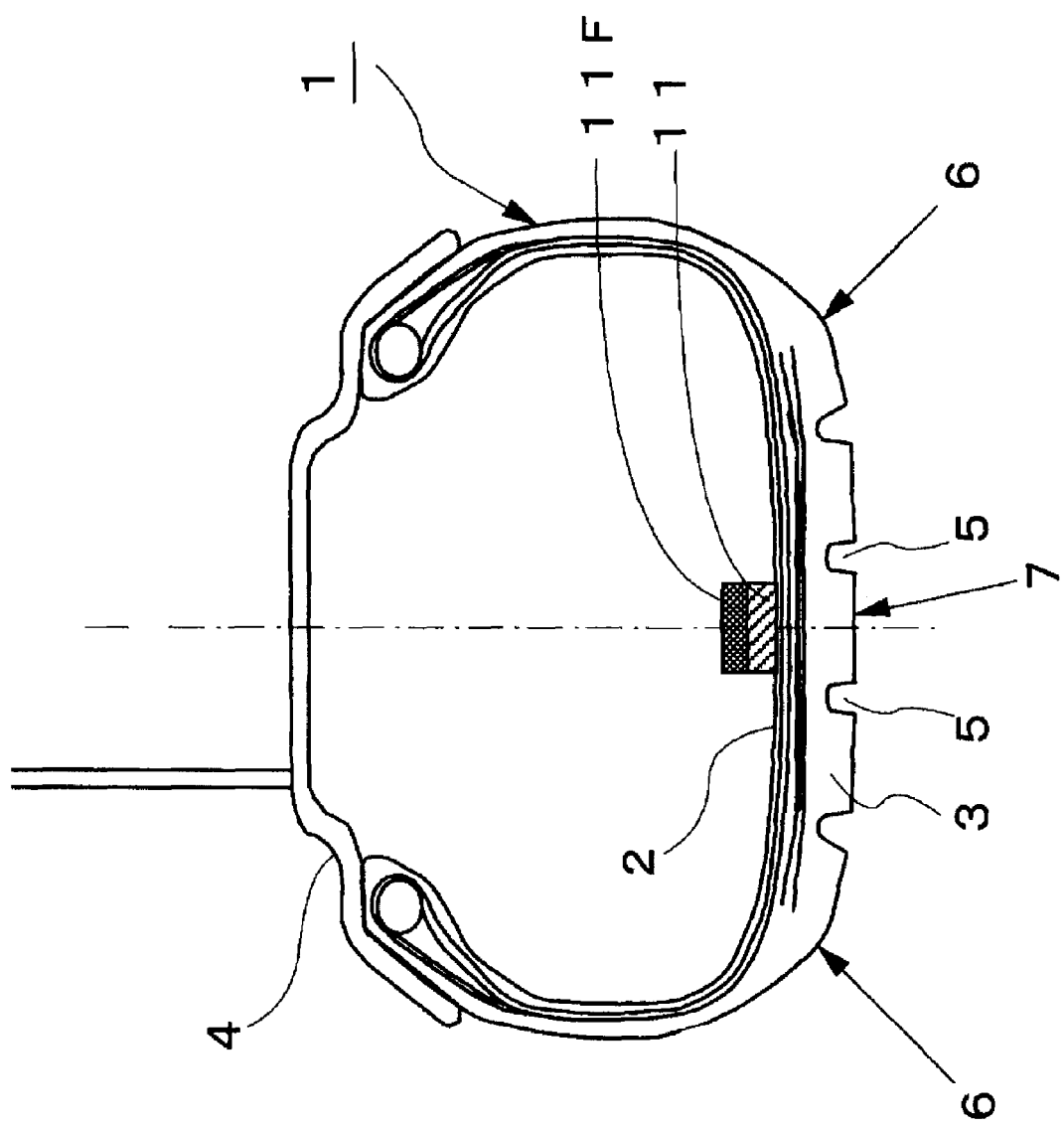
FIG. 2 is an illustration showing an example of installation of an acceleration sensor.

In the present embodiment, as shown in FIG. 2, the acceleration sensor 11 is placed at the axial (tire width) center in the inner liner region 2 of a tire 1 such that the detection can be made in the radial direction of the tire, and the radial acceleration acting on the inner surface of the tire tread (hereinafter referred to as tread also) 3 is detected. Note that the calculating section 10B is disposed on the not-shown vehicle body.

As an arrangement for sending output signals of the acceleration sensor 11 to the calculating section 10B, it is preferable that a transmitter 11F is installed in the inner liner region 2 or on a wheel 4 as shown in FIG. 2, for instance, and the output signals of the acceleration sensor 11, after they are amplified by a not-shown amplifier, are transmitted wirelessly to the calculating section 10B disposed on the vehicle body. The arrangement may also be such that the calculating section 10B is installed on the tire 1 and the results of estimation by the wear estimating means 19 are transmitted to a not-shown vehicle control unit on the vehicle body.

Figure 3:
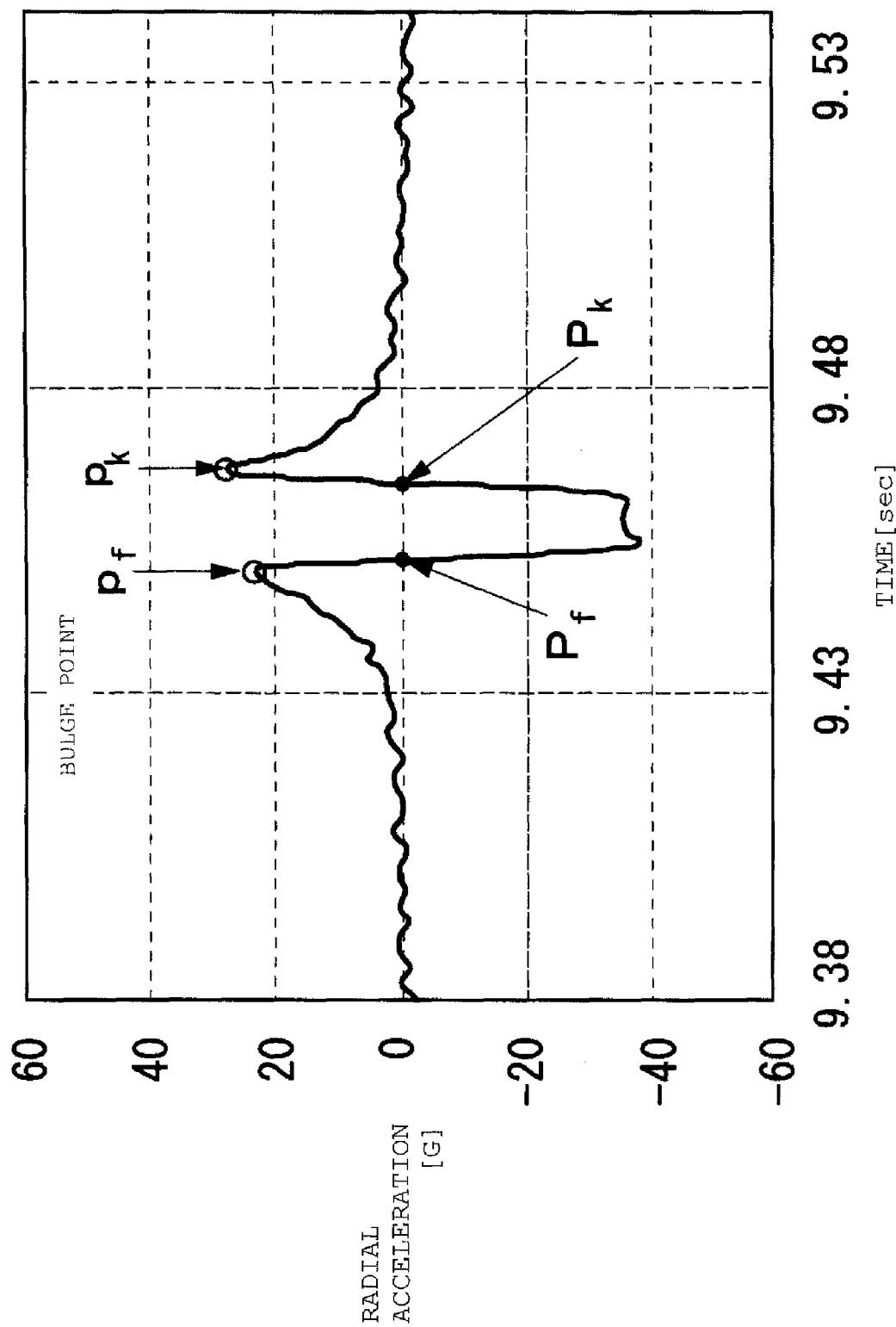
FIG. 3 is a diagram showing a waveform of radial acceleration of a tire detected by an acceleration sensor.

The acceleration differentiated waveform calculating means obtains a differentiated waveform of acceleration in the radial direction of a tire (hereinafter referred to as radial acceleration), as shown in FIG. 3, by temporally differentiating a time-series waveform of the radial acceleration acting on the tire tread 3 as detected by the acceleration sensor 11.

Figure 4:
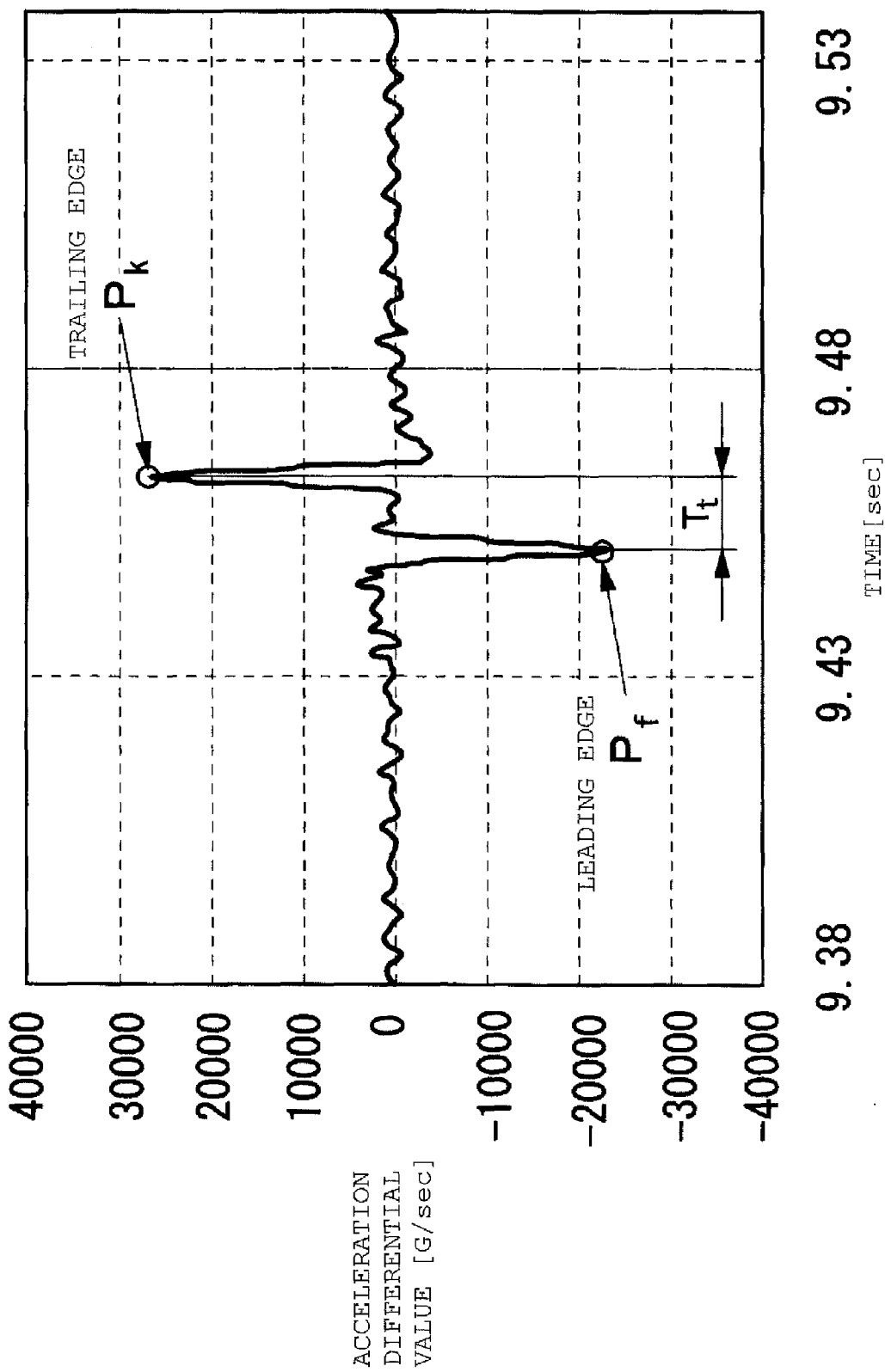
FIG. 4 is a diagram showing a differentiated waveform of radial acceleration of a tire.

The deformation speed calculating means 13 calculates differential peak values which are the values of two peaks (leading-edge-side peak $P_f$ and trailing-edge-side peak $P_k$ shown in FIG. 4) appearing in the differentiated waveform of radial acceleration. In the present embodiment, the differential peak value of the leading-edge-side peak $P_f$ is used as the deformation speed $V_{tf}$ of the tread on the leading edge side, and the differential peak value of the trailing-edge-side peak $P_k$ as the deformation speed $V_{tk}$ of the tread on the trailing edge side.

The rotation time calculating means 14 calculates the time difference between time $T_1$ at which the trailing-edge-side peak of the two peaks appears and time $T_2$ at which the trailing-edge-side peak appears again after one revolution of the tire 1 ($T_r=T_2-T_1$). This time difference $T_r$ is the rotation time required by the tire to make one revolution. Hereinafter, the $T_r$ is referred to as the rotation time.

The standardized deformation speed calculating means 15 calculates the standardized deformation speed $V^m{}_{tf}$ on the leading edge side and the standardized deformation speed $V^m{}_{tk}$ on the trailing edge side by standardizing the deformation speeds $V_{tf}$ and $V_{tk}$ on the leading edge side and the trailing edge side, respectively, calculated by the deformation speed calculating means 13 using the information on the rotation time $T_r$ calculated by the rotation time calculating means 14. Then the standardized deformation speed calculating means 15 calculates an average standardized deformation speed $V^m{}_t$, which is a mean value of the absolute value of standardized deformation speed $V^m{}_{tf}$ on the leading edge side and the absolute value of standardized deformation speed $V^m{}_{tk}$ on the trailing edge side. This average standardized deformation speed $V^m{}_t$ becomes a measure for wear estimation.

The bandpass filter 16 passes signals having frequency components in a specific frequency range within 10 to 2000 Hz out of the signals of radial acceleration detected by the acceleration sensor 11. In the present embodiment, the specific frequency range is 50 to 200 Hz.

The extra-contact-patch vibration level calculating means 17 calculates a vibration level in a portion outside the contact patch (extra-contact-patch portion) of the tire on the leading edge side thereof from the signals of radial acceleration which comprise the frequency components of 50 to 200 Hz having passed through the bandpass filter 16.

The storage means 38 stores a V(M)–v map 18M showing the extra-contact-patch vibration level, determined in advance for different degrees M of tire wear, and the above-described average standardized deformation speed $V^m{}_t(M)$.

The tire wear estimating means 19 estimates the degree M of tire wear from the average standardized deformation speed $V^m{}_t$ calculated by the standardized deformation speed calculating means 15, the vibration level v calculated by the extra-contact-patch vibration level calculating means 17, and the V(M)–v map 18M.

Next, a method for estimating tire wear according to a preferred embodiment will be explained.

First the acceleration in the radial direction of the inner surface of the inner liner region 2 which deforms along with the deformation of the tire tread 3 is detected by the acceleration sensor 11, and the detected acceleration, after it is amplified by a not-shown amplifier, is transmitted from a transmitter 11F installed in the inner liner region 2 to the calculating section 10B provided on the vehicle body. The acceleration differentiated waveform calculating means 12 of the calculating section 10B determines a differentiated waveform of radial acceleration by temporally differentiating the time-series waveform of the detected radial acceleration. Note that this differentiated waveform of radial acceleration is also a time-series waveform.

FIG. 3 is a diagram showing an example of a radial acceleration waveform detected by an acceleration sensor, the horizontal axis representing time (sec) and the vertical axis the magnitude (G) of radial acceleration. In the test, summer tires of 205/65R15 size, with an acceleration sensor installed at the axial center in the inner liner region, were run on a flat belt testing machine under the conditions of a speed of 40 km/h, a load of 5 kN, and an internal pressure of 230 kPa. When the acceleration is of a positive value, the acceleration is occurring in the direction of the tire center, and when it is of a negative value, the acceleration is occurring in the direction of the out of the tire. These accelerations are occurring substantially in proportion to the forces the tire tread is receiving in the radial direction and are correlated to the amount of radial deformation. The vicinities of the two peaks $p_f$ and $p_k$ on the positive side of the radial acceleration waveform are outside the contact patch and subject to such forces as to deform the tread 3 toward the outside of the tire, and therefore it is known that the two peaks $p_f$ and $p_k$ are the bulge points. And the levels of these two peaks $p_f$ and $p_k$ are the indices corresponding to the amounts of tread deformation outside the contact patch.

Also, FIG. 4 is a diagram showing a differentiated waveform of the radial acceleration, the horizontal axis representing time (sec) and the vertical axis the differential value (G/sec) of radial acceleration. The two peaks $p_f$ and $p_k$ of the differentiated waveform are the points where the radial force the tread 3 receives are changing most markedly. The levels of the peaks $p_f$ and $p_k$ correspond to the deformation speeds at the leading edge and the trailing edge, respectively, of the tire 1.

Also, the time interval between the peaks $P_f$ and $P_k$ varies greatly with tire speed.

The data for the differentiated waveform of the radial acceleration are sent to each of the deformation speed calculating means 13 and the rotation time calculating means 14.

The deformation speed calculating means 13 calculates each of the values (hereinafter referred to as differential peak values) of the two peaks $P_f$ and $P_k$ of the differentiated waveform and sends these data as the deformation speeds $V_{tf}$ and $V_{tk}$ of the tread on the leading edge side and the trailing edge side to the standardized deformation speed calculating means 15.

Figure 9:
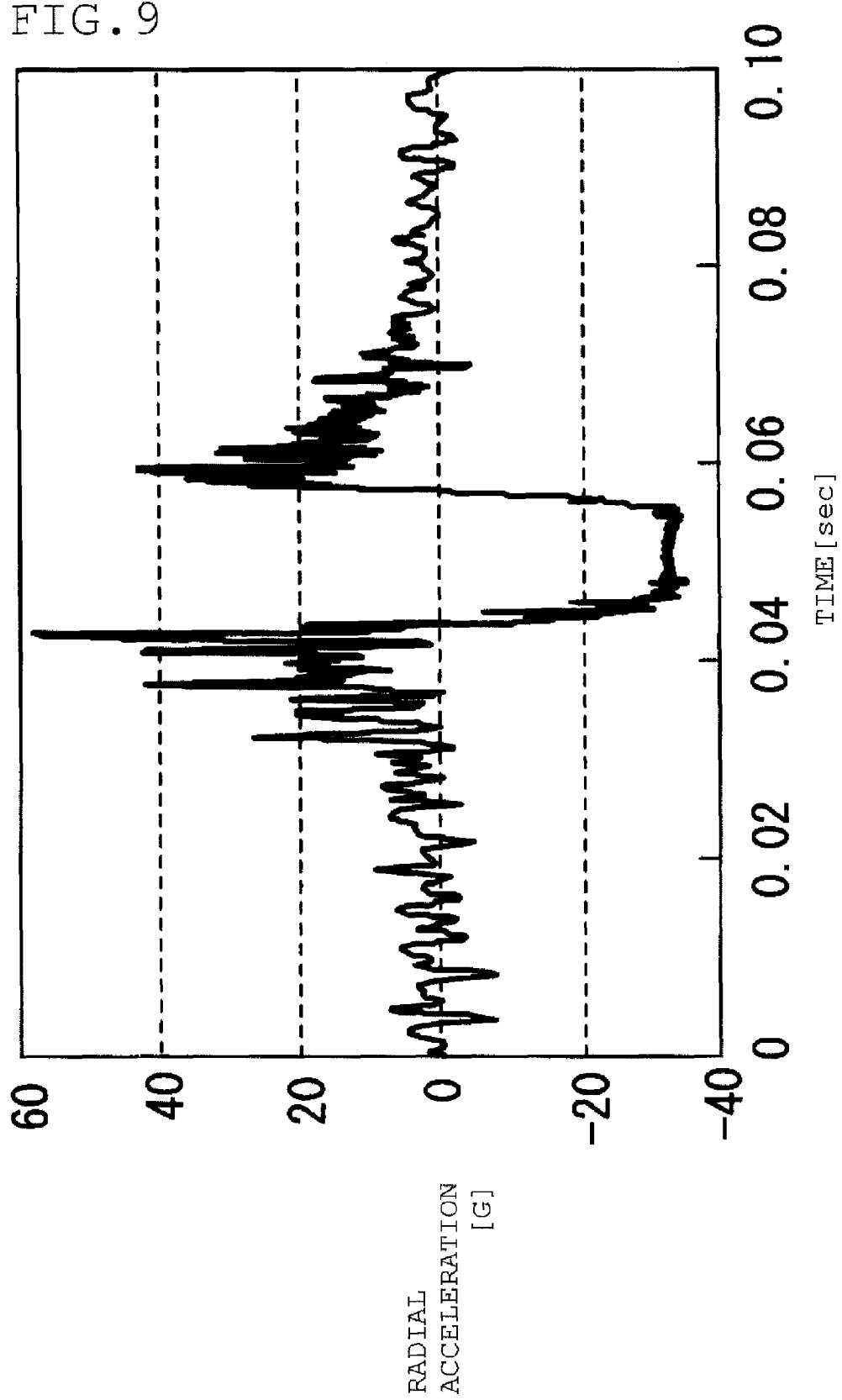
FIG. 9 is a diagram showing a radial acceleration waveform containing high-frequency noise components.

It should be noted that, while it depends on the sensitivity of the acceleration sensor 11, the signals of an actual acceleration sensor contains high-frequency components as shown in FIG. 9 and thus it is difficult to accurately identify the positions of the two peaks $P_f$ and $P_k$. Therefore, an appropriate low-pass filter is used to remove the high-frequency components so as to obtain a radial acceleration waveform as shown in FIG. 3. This will lead to stable detection data of peak positions, peak levels, etc. In other words, wear estimation can be carried out with greater constancy. A more reliable estimation can be performed by changing the frequencies of the low-pass filter according to tire speed, thereby creating a similar waveform for each speed.

Also, instead of the above-mentioned peak values, the average of differential values in a specific range near the peaks, especially, the averaged differential value in the periphery of the peaks, can be used as the deformation speed.

On the other hand, the rotation time calculating means 14 calculates the time difference between time $T_1$ at which the trailing edge peak $P_k$ appears and time $T_2$ at which the trailing edge peak $P_k$ appears again after one revolution of the tire 1 and sends this data as the rotation time $T_r$ of the tire 1 to the standardized deformation speed calculating means 15. It is to be noted that the rotation time $T_r$ of the tire 1 may also be calculated using the leading-edge-side peak $P_f$.

In this embodiment, therefore, the deformation speeds $V_{tf}$ and $V_{tk}$ of the tread 3 and the rotation time $T_r$ of the tire 1 can be calculated from the radial acceleration of the tire detected by the acceleration sensor 11.

The deformation speed $V_t$ of the tread changes in relation to the degree M of wear and the rotational speed $W_r$ of the tire. Hence, the following three types of test tires were prepared:

Test tire 1 is a new tire, and the depth of circumferential grooves 5 as shown in FIG. 2 is about 8 mm.

Test tire 2 is a tire which has a remaining depth of circumferential grooves 5 of about 4 mm.

Test tire 3 is a tire which has a remaining depth of circumferential grooves 5 of about 2 mm and shows an almost uniform wear down to a level near the slip sign.

Figure 5:
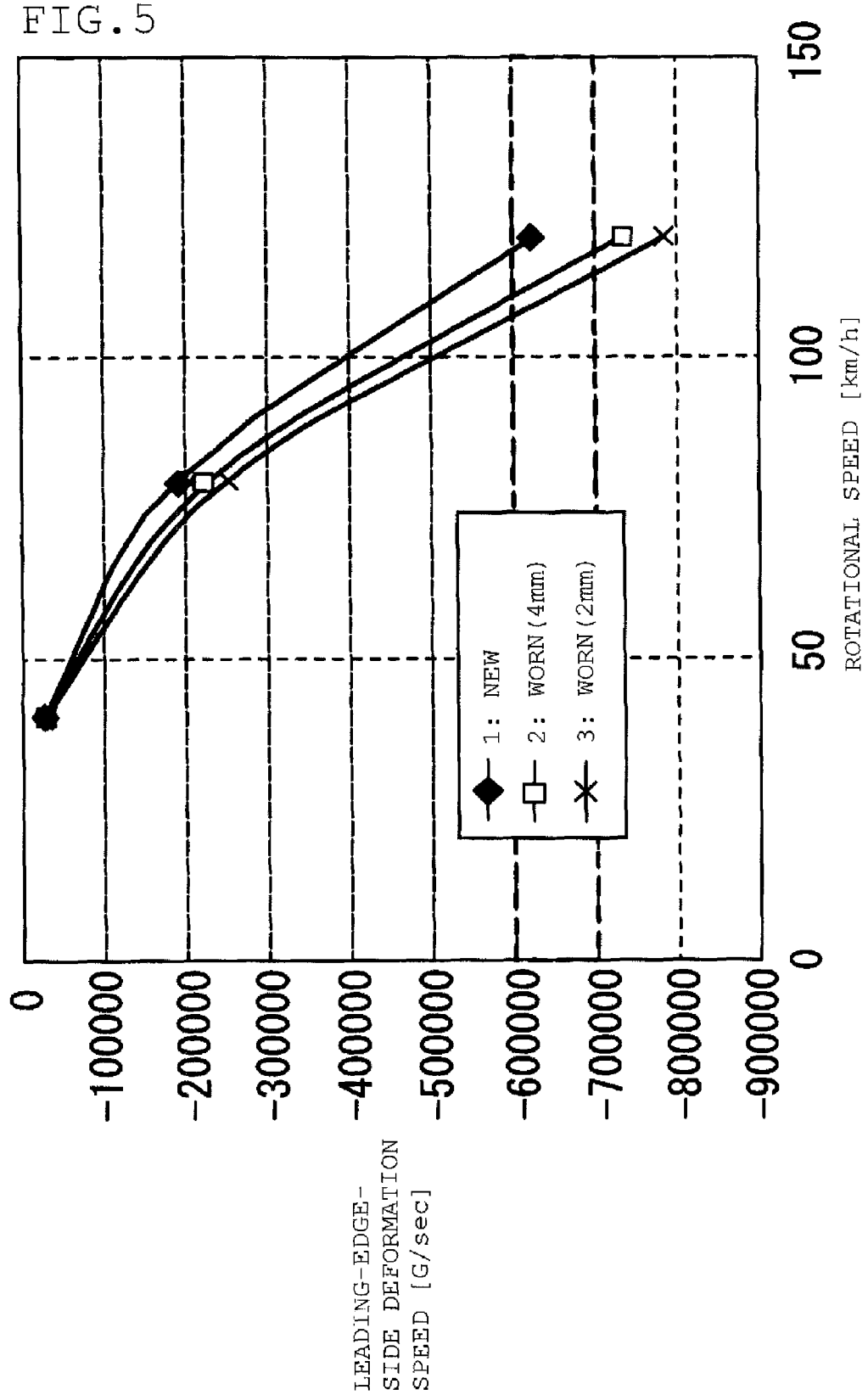
FIG. 5 is a graph showing a relationship between the rotational speed of a tire and the deformation speed of the tread.

FIG. 5 is a graph showing the results of investigation on the relationship between the rotational speed $W_r$ of the tire and the deformation speed $V_{tf}$ on the leading edge side of the tread, determined for different degrees M of tire wear, when the load is 5 kN and the tire rotational speed $W_r$ is changed from 40 to 80 to 120 km/h, using the three types of test tires. As shown in the figure, the deformation speed $V_t$ of the tread changes considerably in relation to the rotational speed $W_r$ of the tire.

In the present embodiment, a standardized deformation speed $V'''_{tf}$ is calculated by standardizing the deformation speed $V_{tf}$ on the leading edge side using the rotation time $T_r$ calculated by the rotation time calculating means 14, and the degree M of tire wear is estimated using this standardized deformation speed $V'''_{tf}$. The deformation speed is inversely proportional to the cube of the rotation time $T_r$ of the tire. In this embodiment, therefore, the standardized deformation speed $V'''_{tf}$ on the leading edge side is calculated using the following equation (1):

$$V'''_{tf} = V_{tf} \cdot T_r^3 \quad (1)$$

The standardized deformation speed $V'''_{tk}$ on the trailing edge side is also calculated in the same way.

Next, using the following equation (2), an average standardized deformation speed $V'''_t$, which is a mean value of the absolute value of standardized deformation speed $V'''_{tf}$ on the leading edge side and the absolute value of standardized deformation speed $V'''_{tk}$ on the trailing edge side, is calculated, and this value is used as a measure for wear estimation:

$$V'''_t = (|V'''_{tf}| + |V'''_{tk}|)/2 \quad (2)$$

In this way, if the average standardized deformation speed $V'''_t$ is used as an index of deformation speed, then the estimation of tire wear can be carried out with better constancy because it will be less susceptible to the effects of the longitudinal forces working on the tire 1 or the camber angle of the tire 1. Note that absolute value of $V'''_{tf}$ and absolute value of $V'''_{tk}$ are used in the calculation of the average standardized deformation speed $V'''_t$ because there is a positive-negative inversion in the sign of the deformation speed $V_t$ of the tread between the leading edge side and the trailing edge side.

As described above, when a simple average is used as the average standardized deformation speed $V'''_t$, it is necessary to take an average of the absolute values. Note, however, that the method for calculating the average standardized deformation speed $V'''_t$ is not limited to the simple averaging, but other methods, such as one using a root-mean-square, may also be used.

Figure 6:
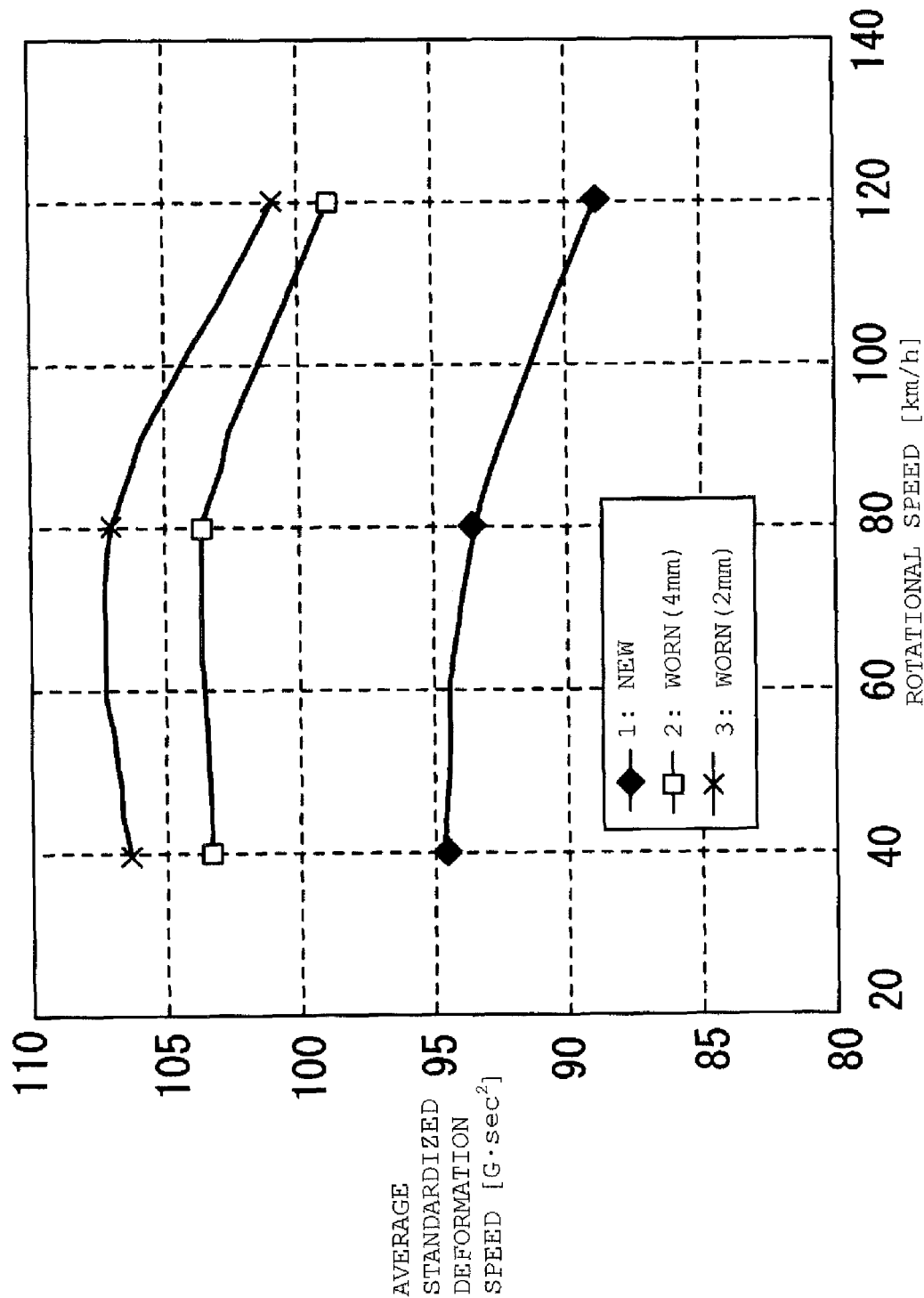
FIG. 6 is a graph showing a relationship between the rotational speed of a tire and the standardized deformation speed.

FIG. 6 is a graph showing a relationship between the rotational speed $W_r$ of the tire and the calculated average standardized deformation speed $V'''_t$. The average standardized deformation speed $V'''_t$ remains nearly constant up to the tire rotational speed $W_r$ of 80 km/h, and with the progress of wear, the values thereof grow larger. When the tire rotational speed $W_r$ is 120 km/h, the values of the average standardized deformation speed $V'''_t$ drop a little. This is considered due to the increased effects of centrifugal force and the effects of a change in dynamic radius of the tire. However, wear is an extremely slow change over time and it may not be necessary to monitor it at all times. And there is no problem with confining the speeds at which tire wear is estimated in a lower-speed range. The data for the average standardized deformation speed $V'''_t$ is sent to the tire wear estimating means 19. The tire wear estimating means 19 can perform wear estimation with excellent constancy if it does it in the range of tire rotational speed $W_r$ of 80 km/h or below.

However, measurement at 20 km/h or above is preferred because the gain of the acceleration signals below 20 km/h is small in comparison with the noise attributable mainly to road surface roughness.

Figure 7:
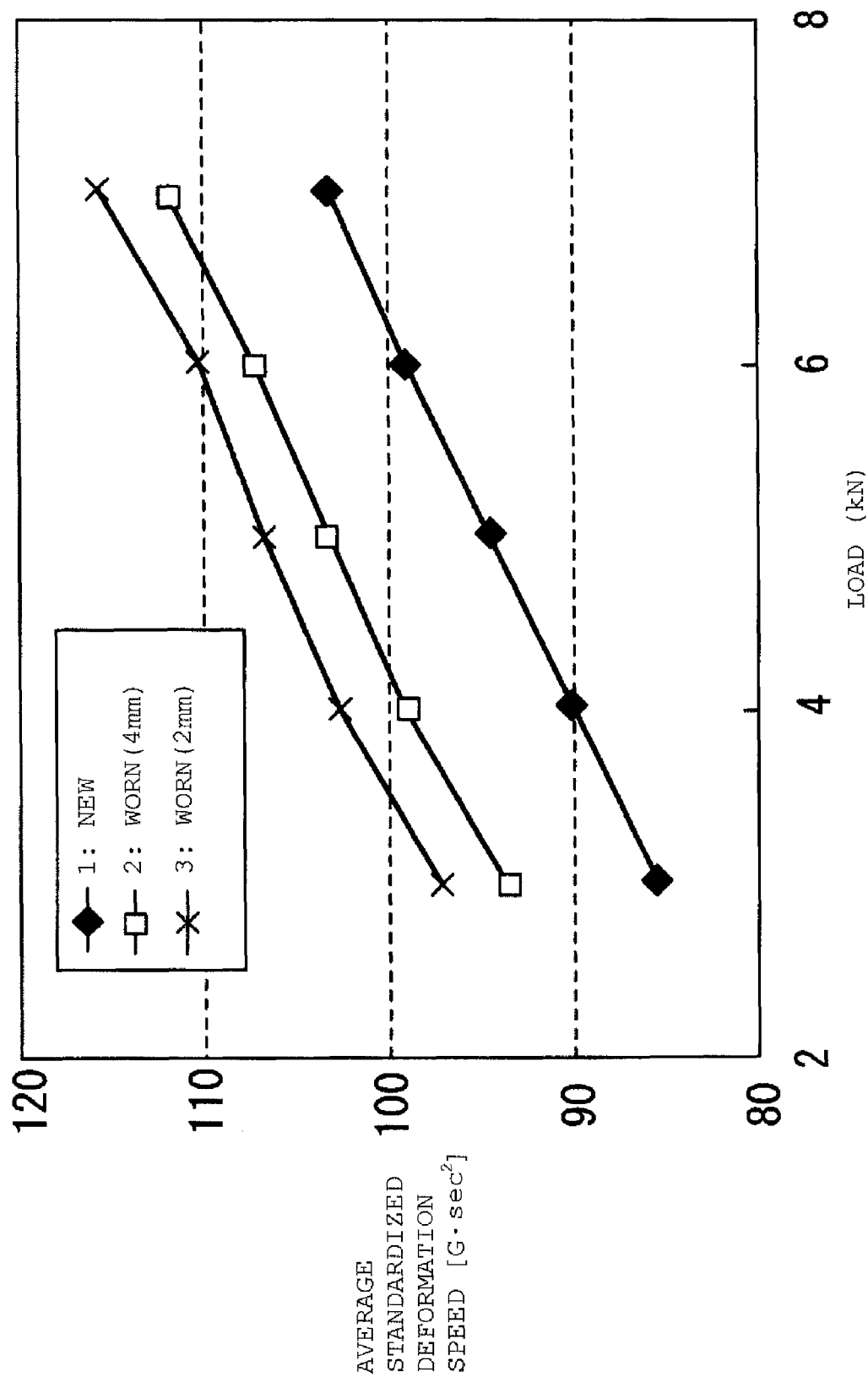
FIG. 7 is a graph showing a relationship between the load and the standardized deformation speed.

FIG. 7 is a graph showing relationships between the average standardized deformation speed $V'''_t$ and the load when the above-cited three types of test tires (test tires 1 to 3) were run at a speed of 40 km/h on a flat belt testing machine, with the load changed from 3 kN to 7 kN in increments of 1 kN. Also, slip-resistant material Safety-Walk applied on the flat belt was used to serve as the road surface. From the graph, it can be seen that the average standardized deformation speed $V'''_t$ varies with the degree M of wear even in the same road surface condition. It is to be noted that the effect of the load can be corrected by the measured load or the load index value. The method of measurement may include one to be made at the suspension, and the contact patch length or the contact time ratio (value of contact time divided by rotation time) is conceivable as the load index value, for instance. The contact patch length and the contact time ratio can both be measured from the output signals of the acceleration sensor.

Figure 8:
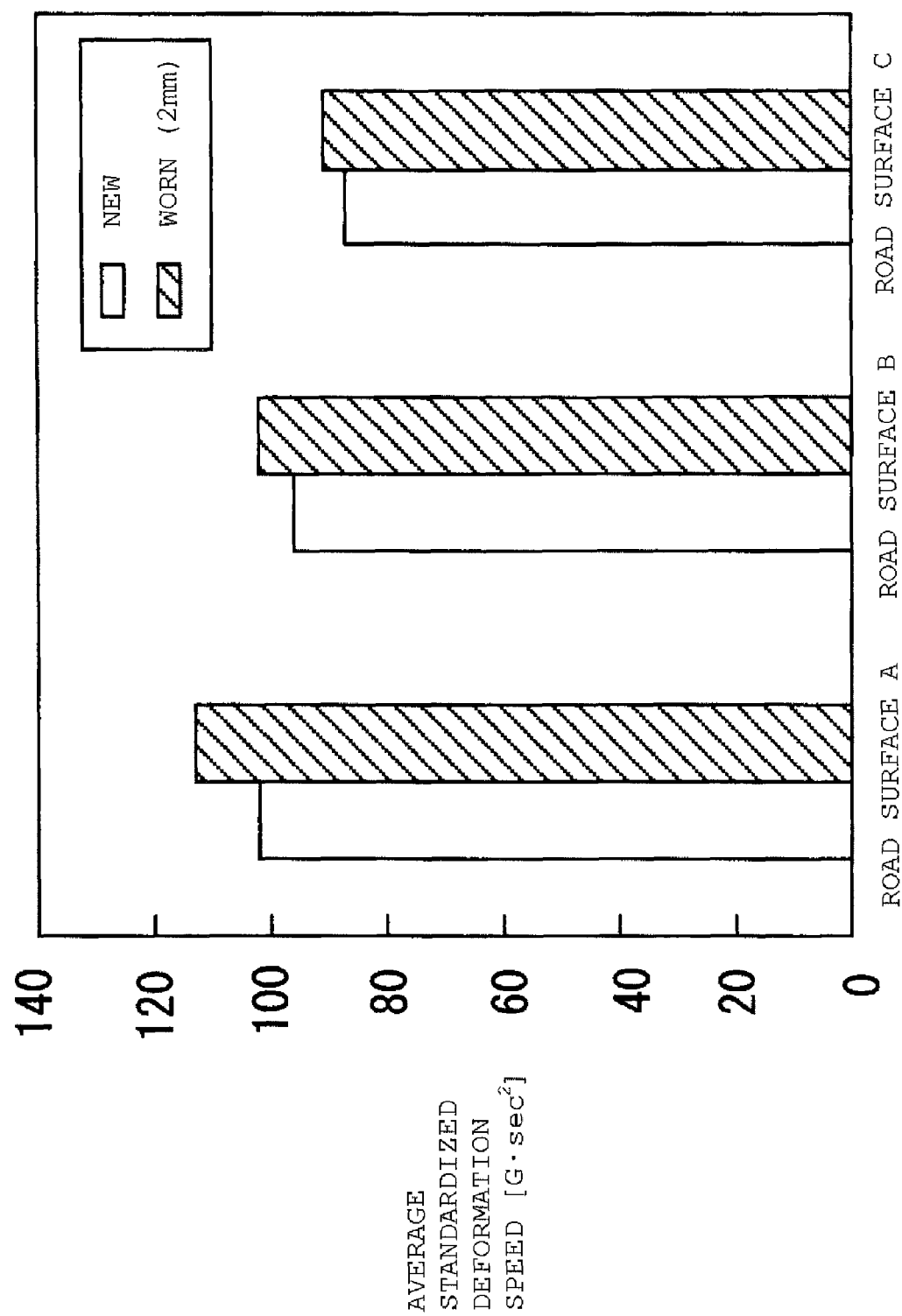
FIG. 8 is a graph showing a relationship between the condition of road surface and the standardized deformation speed.

The average standardized deformation speed $V'''_t$ on different road surfaces were measured, using a new tire (test tire 1) and a worn tire (test tire 3). The results are shown in FIG. 8. Road surface A is of Safety-Walk, road surface B is of a flat and smooth asphalt, and road surface C is of a bumpy (fairly rough) asphalt. The load used in the test was all 5 kN, and the speed was 40 km/h. From the figure, it can be seen that the greater the roughness of the road surface is, the lower the average standardized deformation speed $V'''_t$ is. However, there remains the difference between the new tire and the worn tire.

Figure 13A:
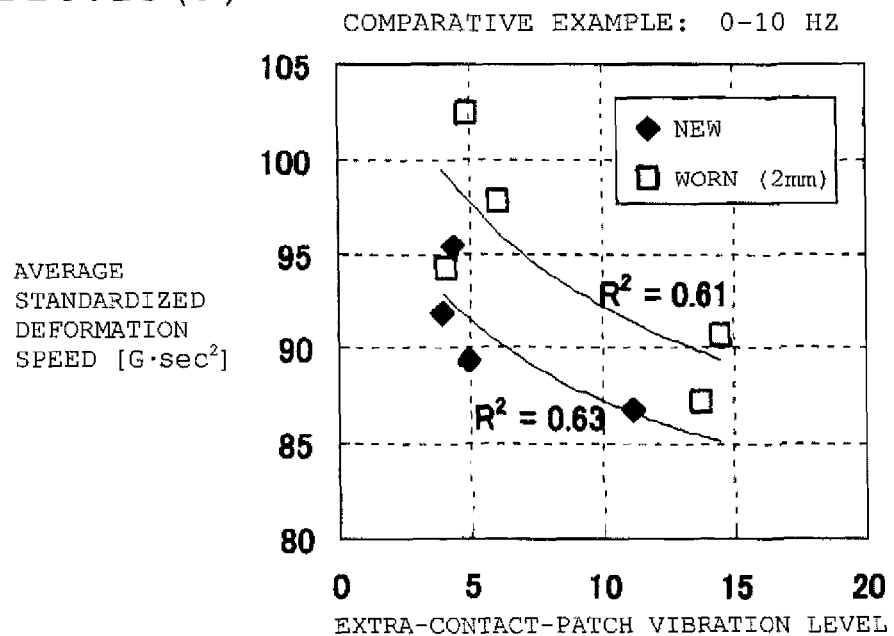
FIG. 13 is a graph showing a relationship between the extra-contact-patch vibration level and the standardized deformation speed.
Figure 13B:
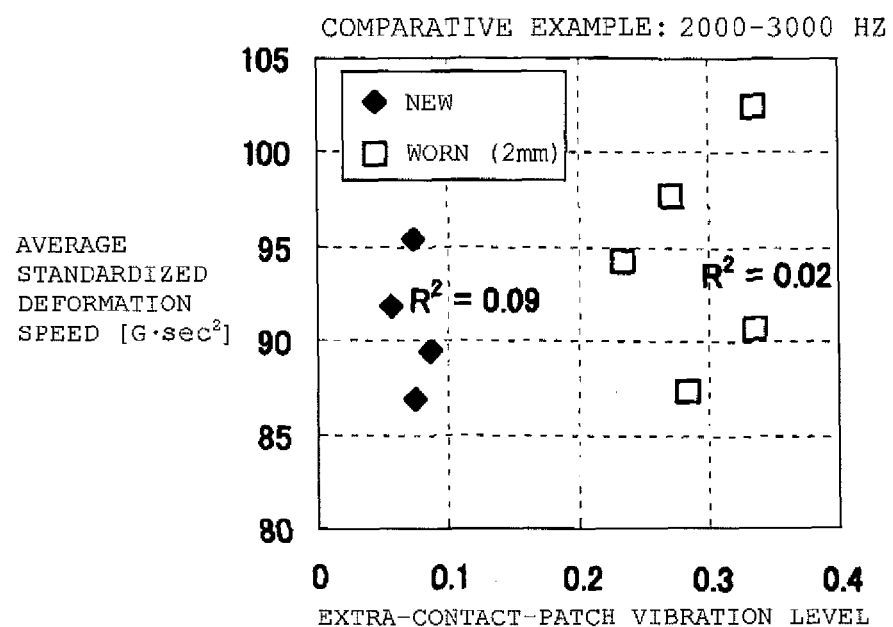

On the other hand, the signals of radial acceleration detected by the acceleration sensor 11 are inputted to the extra-contact-patch vibration level calculating means 17 after passing through the bandpass filter 16. The vibration level of the frequency components in the specific frequency range within 10 to 2000 Hz, out of the frequency components of the extra-contact-patch vibration contained in the signals of radial acceleration, shows a high correlation with the deformation speed $V_t$ of the tread 3. That is, as shown in FIGS. 13A and 13B, the frequency components lower than 10 Hz are subject to the effect of macro deformation of the contact patch, and therefore there will be greater errors if the frequency components in this range are used.

Figure 14:
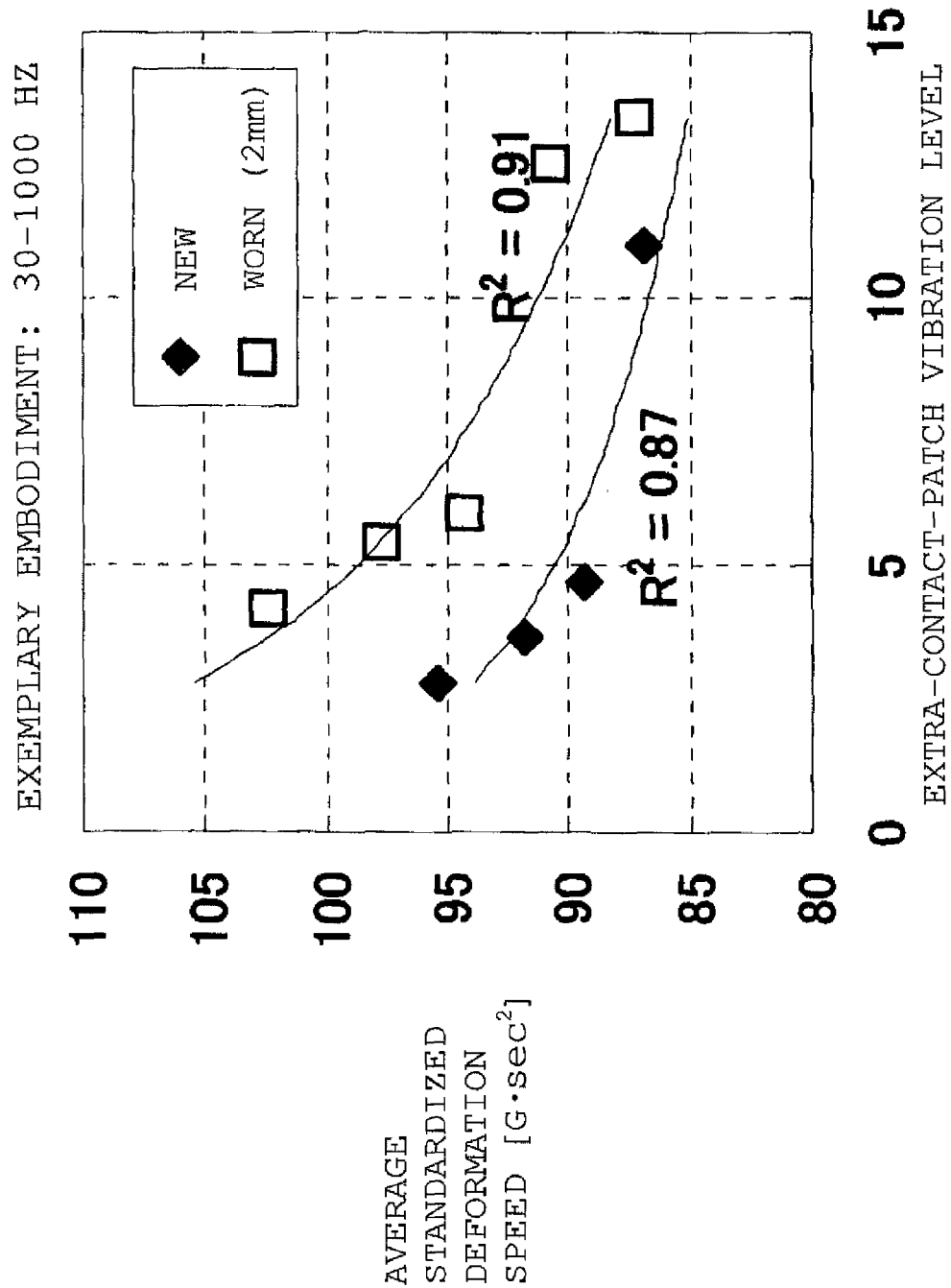
FIG. 14 is a graph showing a relationship between the extra-contact-patch vibration level and the standardized deformation speed.
Figure 15A:
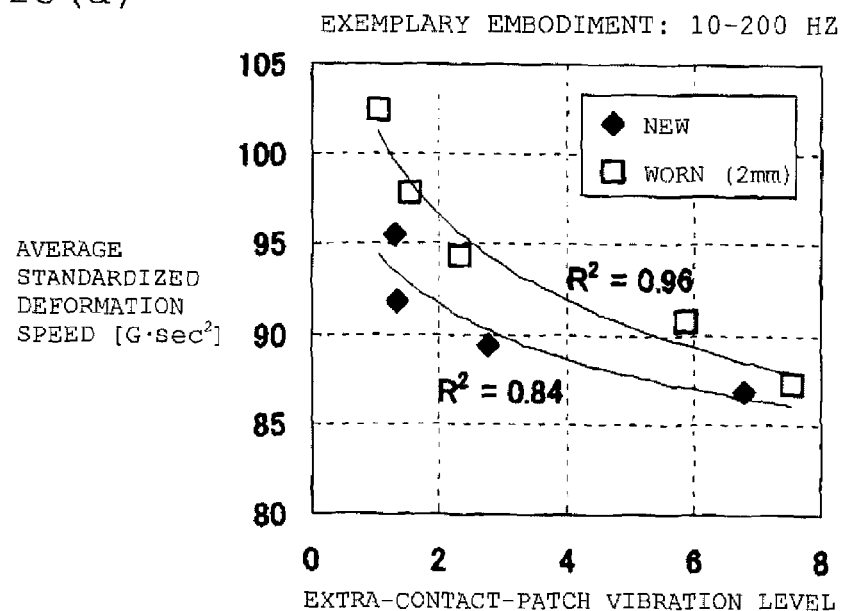
FIG. 15 is a graph showing a relationship between the extra-contact-patch vibration level and the standardized deformation speed.
Figure 15B:
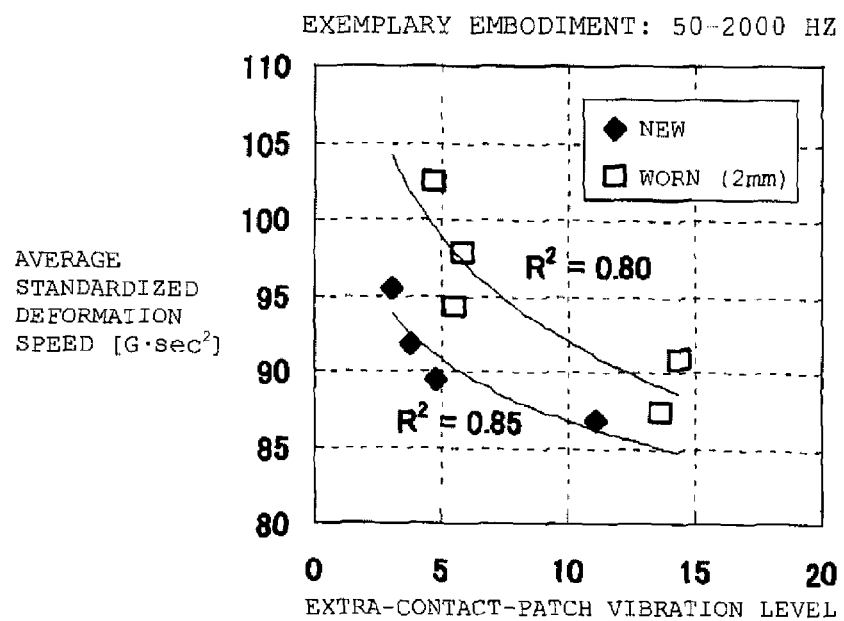

Also, the frequency components higher than 2000 Hz are such that the vibration level itself is low. And therefore they little affect the deformation speed $V_t$ and have a low correlation (correlation factor R) therewith. Accordingly, it is preferable that the extra-contact-patch vibration level to be used in correcting the deformation speed $V_t$ or correcting the degree M of wear is the vibration level of frequency components in the specific frequency range of 10 to 2000 Hz by excluding the frequency ranges presented in the comparative examples of FIGS. 13A and 13B. Further, it is more preferable that the specific frequency range is selected from among 30 to 1000 Hz as shown in the exemplary embodiment of FIG. 14. That is, the exemplary embodiments of FIGS. 15A and 15B represent data including the lower limit frequency (10 Hz) and the upper limit frequency (2000 Hz) of the preferred range. Yet, when compared with the data not including the lower limit and the upper limit as shown in FIG. 14, they tend to show a little inferior correlation. Therefore, more preferable data can be obtained if the specific frequency range is selected from among 30 to 1000 Hz as shown in FIG. 14.

Furthermore, while the specific frequency range may normally be selected as appropriate for each tire type or speed range to be measured, excellent data can be obtained irrespective of tire type or the like, by selecting the specific frequency range from among 30 to 1000 Hz.

The bandpass filter 16 passes signals having frequency components in the specific frequency range within 10 to 2000 Hz out of the signals of radial acceleration detected by the acceleration sensor 11. In the present embodiment, the specific frequency range is 50 to 200 Hz.

Figure 10:
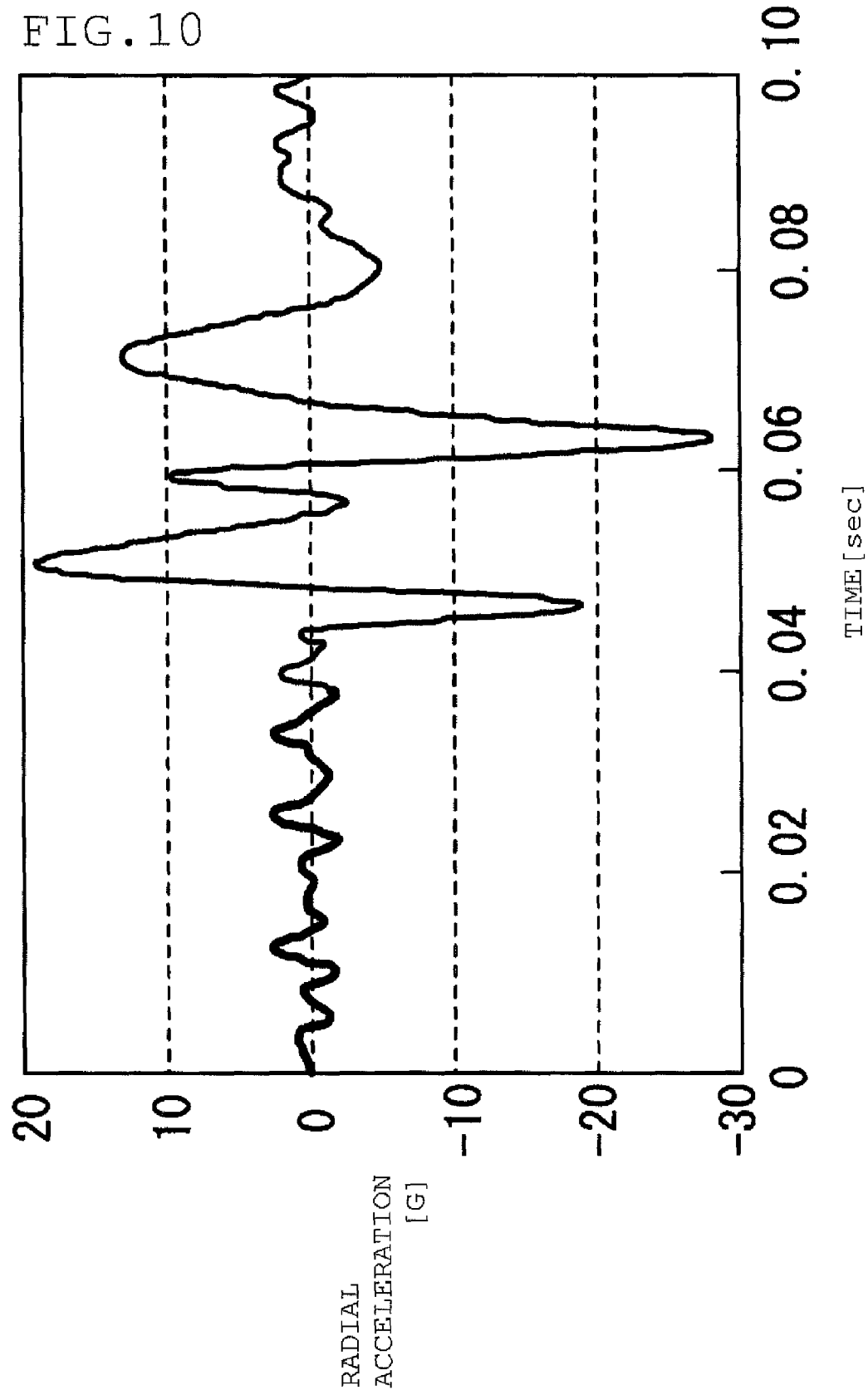
FIG. 10 is a diagram showing a radial acceleration waveform after passing through a bandpass filter when input vibrations are large.

FIG. 9 is a diagram showing an example of signals of radial acceleration detected by the acceleration sensor 11, and FIG. 10 shows a waveform of acceleration in the radial direction of a tire when the above-mentioned signals are passed through the bandpass filter 16 having the cutoff frequencies of 50 to 200 Hz. As FIG. 10 shows, large waveforms are left in the contact patch portion, whereas waveforms corresponding to the extra-contact-patch vibrations of the tread are observed in the extra-contact-patch portion on the leading edge side to the front and the extra-contact-patch portion on the trailing edge side to the rear of the large waveforms.

The extra-contact-patch vibration level calculating means 17 extracts the vibration of the extra-contact-patch portion on the leading edge side, shown by a heavy line in the figure, from the above-mentioned waveforms and calculates the vibration level (extra-contact-patch vibration level) v thereof. It is to be noted that the position of the leading edge used herein is the position of the peak $P_f$ of the differentiated waveform of radial acceleration as shown in FIG. 4.

Concerning the range from which to select vibration, it is preferable that the vibration is selected from the range of 30 percent or less of tire circumferential length from the contact edge, and it is more preferable that it is selected from the range of 20 percent or less thereof. In the present embodiment, the vibrations in the range of 10 percent or less of tire circumferential length forward from the bulge point are extracted, the RMS value (root-mean-square) of the signals of the extracted vibrations is calculated, and the calculated result is used as the extra-contact-patch vibration level v. The data for the detected extra-contact-patch vibration level v is sent to the tire wear estimating means 19. At the tire wear estimating means 19, the wear of tire is estimated using the data for the detected extra-contact-patch vibration level v and the data for the average standardized deformation speed $V'''_t$.

Figure 11:
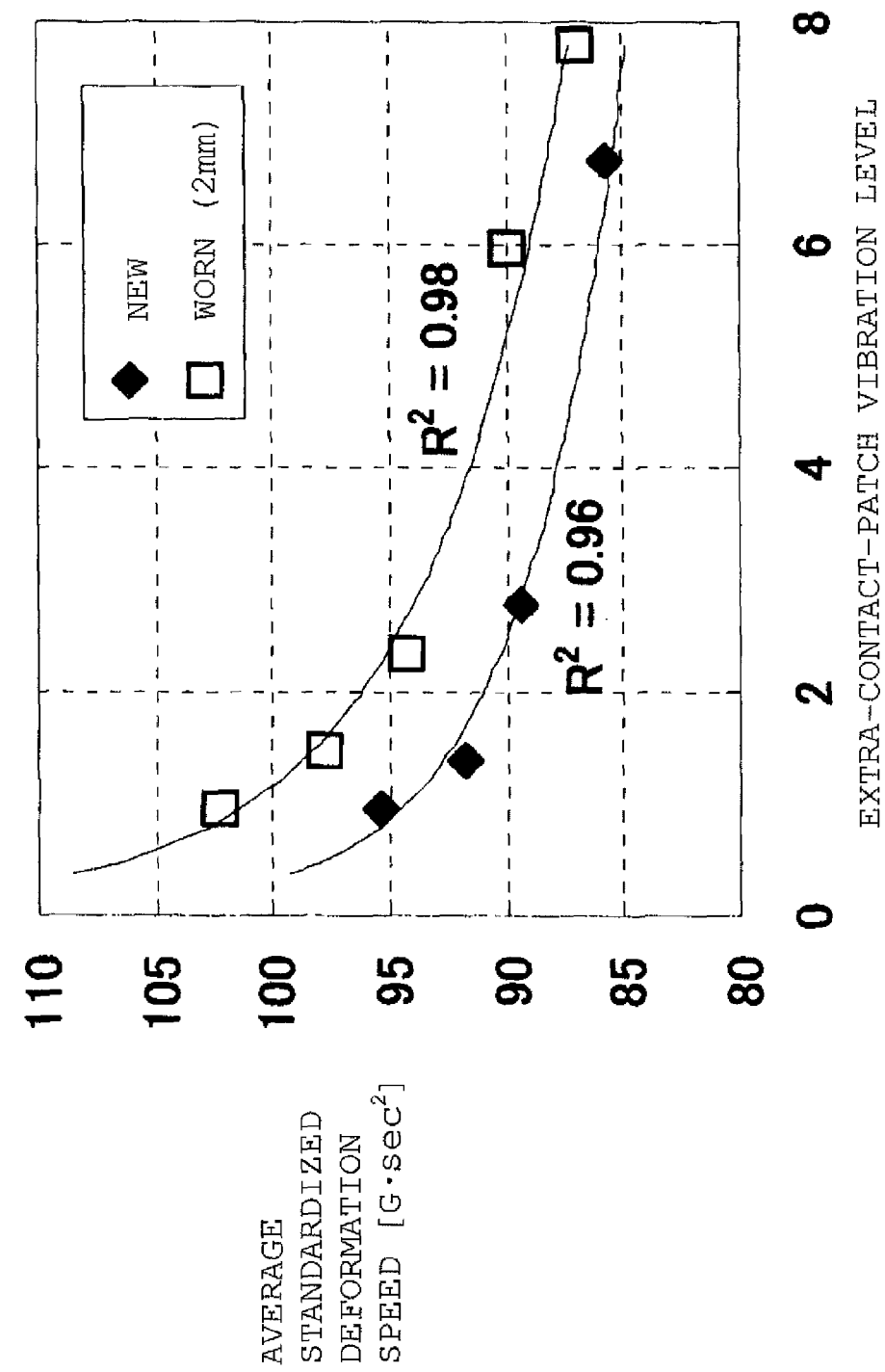
FIG. 11 is a graph showing a relationship between the extra-contact-patch vibration level and the standardized deformation speed.
Figure 12:
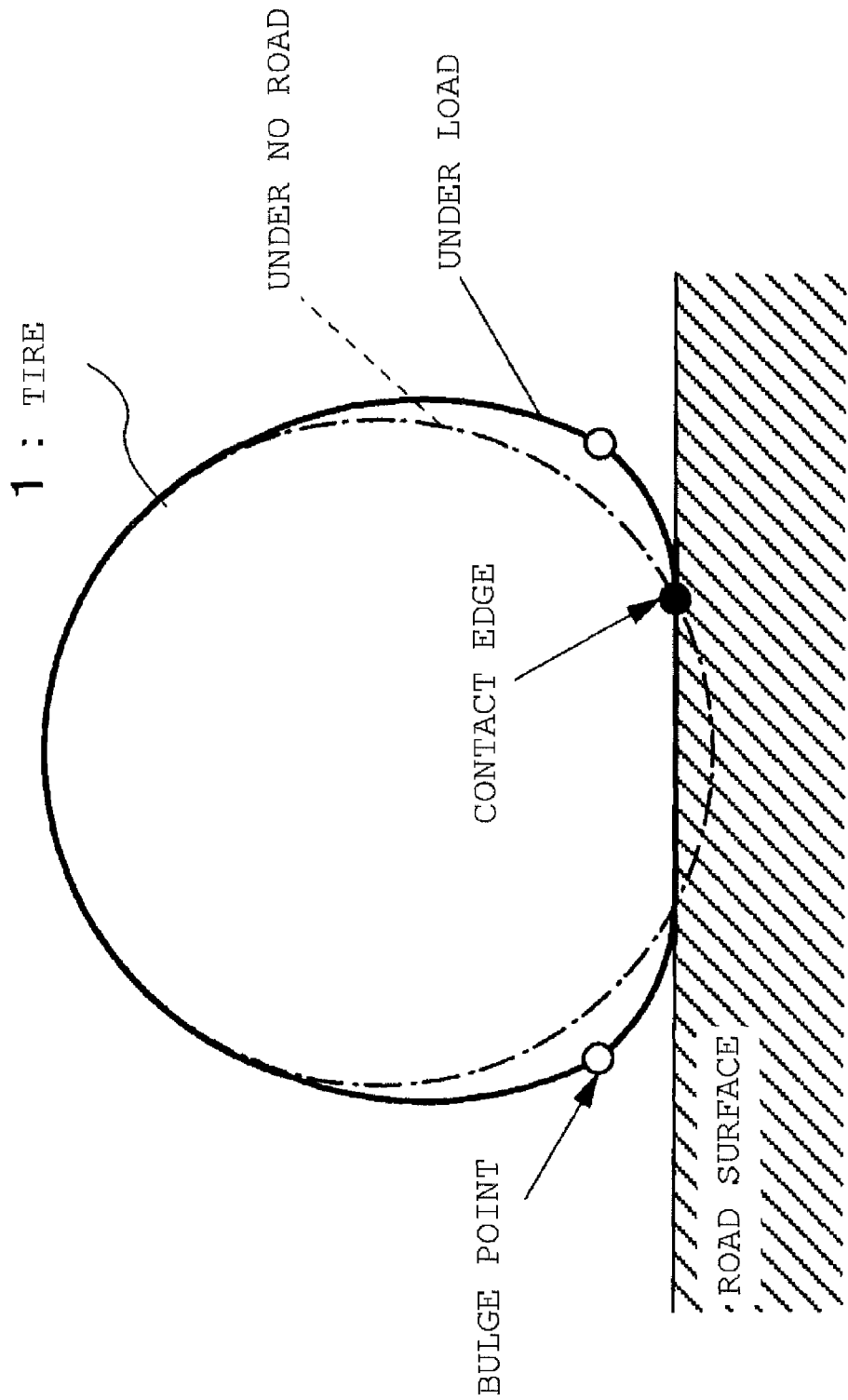
FIG. 12 is a schematic illustration showing a profile of a tire under load.

FIG. 11 is a graph showing an example of a V(M)–v map 18M used in estimating tire wear, the horizontal axis representing the extra-contact-patch vibration level v and the vertical axis representing the average standardized deformation speed $V'''_t$. The tires used in preparing this map 18M are a new tire (test tire 1) and a worn tire (test tire 3) as shown in FIG. 8, and the load is 5 kN and the speed 40 km/h. From FIG. 11, it can be seen that the average standardized deformation speed $V'''_t$ tends to go down as the extra-contact-patch vibration level v rises, that is, the road surface roughness becomes greater, but there remains the difference between the new tire and the worn tire over a wide range. Therefore, by comparing the extra-contact-patch vibration level v and the average standardized deformation speed $V'''_t$ with each other, that is, by preparing the graph as a map, it is possible to estimate the degree M of tire wear irrespective of the effects of road surface roughness.

In other words, when the average standardized deformation speed calculated by the standardized deformation speed calculating means 15 is denoted by $V'''_t$ and the extra-contact-patch vibration level calculated by the extra-contact-patch vibration level calculating means 17 by v, the degree M of tire wear can be estimated with excellent accuracy with the tire wear estimating means 19 checking to see on which of the plurality of lines for different degrees M of wear or between which lines (v, $V'''_t$) is located in the V(M)–v map 18M.

It is preferable that the estimation of the degree M of wear is carried out only when the extra-contact-patch vibration level v is within a specific range. That is, when the extra-contact-patch vibration level v is lower than a certain value, the deformation speed changes greatly and is unstable, thus making it unsuitable for wear estimation. On the other hand, when the extra-contact-patch vibration level v is higher than a certain value, the deformation speed $V_t$ cannot be detected with accuracy because the vehicle is running on a rough road with a bumpy surface and therefore the acceleration waveform itself does not stabilize. Hence, erroneous detections can be avoided reliably if the estimation of the degree M of wear is done only when the extra-contact-patch vibration level v is within a specific range.

In the present embodiment as described above, the acceleration in the radial direction of the tread 3 is detected by an acceleration sensor 11 installed in the inner liner region 2 of the tire 1, and the levels of peaks $P_f$ and $P_k$ on the leading edge side and the trailing edge side, respectively, of the tread 3 appearing in the differentiated waveform of the detected radial acceleration are calculated and used as the deformation speeds $V_{tf}$ and $V_{tk}$ of the tire tread, respectively. Then, an average standardized deformation speed $V'''_t$ is calculated by averaging the absolute values of the standardized deformation speed $V''_{tf}$ on the leading edge side and the standardized deformation speed $V''_{tk}$ on the trailing edge side, which have been obtained by standardizing the deformation speeds $V_{tf}$ and $V_{tk}$ using the rotation time $T_r$. Further, the extra-contact-patch vibration level v is calculated by extracting the vibrations within the range of 10% of tire circumferential length forward from the bulge point from the acceleration in the radial direction having been passed through the bandpass filter 16 of 50 to 200 Hz. And the degree M of tire wear is estimated from the average standardized deformation speed $V''_t$, the extra-contact-patch vibration level v, and the V(M)–v map 18M showing a predetermined relationship between the average standardized deformation speed $V''_t$ and the extra-contact-patch vibration level v. As a result, the wear of a tire can be estimated with excellent accuracy irrespective of the differing roughness of road surface.

The rotation time $T_r$ of the tire is obtained from the period (cycle) of the peak $P_f$ on the leading edge side. Also, the deformation speed is inversely proportional to the cube of the rotation time $T_r$ of the tire. In this embodiment, the deformation speeds $V_{tj}$ (j=f, k) is standardized by multiplying the deformation speeds $V_{tf}$ and $V_{tk}$ on the leading edge side and the trailing edge side, respectively, by the cube of the rotation time $T_r$. Therefore, the standardized deformation speed $V''_{tj}$ can be obtained in such a manner that the effect of the tire rotational speed is reduced markedly.

Also, since the acceleration sensor 11 is not exposed in the contact patch of the tire, this method for estimating tire wear excels in tire durability without the loss of tire performance such as grip force.

Also, the estimation of the degree M of wear is done only when the extra-contact-patch vibration level v is within a specific range, so that erroneous detections of the degree M of wear can be avoided.

It should be noted that in the present embodiment, the positions of peaks $P_f$ and $P_k$ of the differentiated waveform of radial acceleration detected by the acceleration sensor 11 as shown in FIG. 4 are defined to be the contact edges, and the differential values of acceleration (differential peak values) at the contact edges are used as the deformation speeds $V_{tj}$ (j=f, k) of the tread 3. However, the arrangement may also be such that the slopes of the radial acceleration waveform at the contact edges, as shown in FIG. 3, are calculated and the calculated values used as the deformation speeds $V_{tj}$ (j=f,k) of the tread 3.

Also, in this embodiment, the degree M of tire wear is estimated using the V(M)–v map 18M showing a predetermined relationship between the average standardized deformation speed $V''_t(M)$ and the extra-contact-patch vibration level v for different degrees M of tire wear. However, the arrangement may also be such that a correlation equation of the extra-contact-patch vibration level v and the average standardized deformation speed $V''_t(M)$ is determined beforehand and the degree M of tire wear is estimated using this correlation equation, the detected extra-contact-patch vibration level v, and the calculated average standardized deformation speed.

Or the degree M of tire wear may be estimated from the average standardized deformation speed $V''_t$, and this estimated degree M of tire wear may be corrected by the detected extra-contact-patch vibration level v. In this case, however, a map showing a relationship between the degree M of tire wear and the extra-contact-patch vibration level v must be prepared in advance, and the degree M of tire wear must be corrected based on this map.

Also, in this embodiment, the vibration level in a portion outside the contact patch on the leading edge side is used as the extra-contact-patch vibration level, but the vibration level may be one in a portion outside the contact patch on the trailing edge side or an average value of the vibration levels on both sides.

Also, a well-known method for extracting the vibration level in a specific frequency range within 10 to 2000 Hz from the acceleration in the radial direction of the tire may be one in which an FFT spectrum is calculated and then the power value or the dB value of the specific frequency range is calculated. However, in consideration of computation load, it is preferable that a bandpass filter is used as in the present embodiment.

It should be understood by those skilled in the art that various modifications and variations can be made to this invention without departing from the scope and spirit of the invention. For example, the detecting methods and measuring methods described herein may be any kinds of methods conceivable. Also, the specific constituent members described herein may take all kinds of form or configuration. Accordingly, the invention is intended to include all such modifications and variations as fall within the scope of the appended claims and the equivalents thereof.

The present application is based on JP 2008-166344 submitted on Jun. 25, 2008, the disclosure of which is hereby incorporated herein by reference.

INDUSTRIAL APPLICABILITY

As described above, the apparatus for estimating tire wear according to the present invention not only excels in durability but also assures estimation of the degree of tire wear with excellent accuracy irrespective of road surface roughness. Hence, the running safety of a vehicle can be enhanced by providing some alarm means that can warn the driver of the wear of the tires.

NUMERAL REFERENCE

1 tire
2 inner liner region
3 tire tread
4 wheel
5 circumferential groove
6 shoulder region
7 center region
10 tire wear estimating apparatus
10A sensor section
10B calculating section
11 acceleration sensor
11F transmitter
12 acceleration differentiated waveform calculating means
13 deformation speed calculating means
14 rotation time calculating means
15 standardized deformation speed calculating means
16 bandpass filter
17 extra-contact-patch vibration level calculating means
18 storage means
18M map
19 tire wear estimating means

The invention claimed is:
1. A method for estimating wear of a tire, comprising:
   detecting a radial acceleration of the tire with an acceleration sensor disposed on an inner surface side of a tire tread;
   calculating a standardized deformation speed in a radial direction of the tire from the detected radial acceleration of the tire;

calculating a tread vibration level at a specific position and in a specific frequency range from the radial acceleration of the tire, the specific position being in a portion outside a contact patch of the tire tread and the tread vibration level changing with road surface roughness;

correcting the calculated standardized deformation speed based on the calculated tread vibration level in the portion outside the contact patch and a relationship between a tread vibration level per degree of tire wear and a standardized deformation speed, which are determined in advance; and estimating a degree of tire wear based on the corrected standardized deformation speed.

2. A method for estimating wear of a tire, comprising:

detecting a radial acceleration of the tire with an acceleration sensor disposed on an inner surface side of a tire tread;

calculating a standardized deformation speed in a radial direction of the tire from the detected radial acceleration of the tire;

calculating a tread vibration level at a specific position and in a specific frequency range from the radial acceleration of the tire, the specific position being in a portion outside a contact patch of the tire tread and the tread vibration level changing with road surface roughness; and correcting a degree of tire wear estimated from the standardized deformation speed, based on the calculated tread vibration level in the portion outside the contact patch and a relationship between degree of tire wear and a tread vibration level in the portion outside the contact patch, which are determined in advance.

3. The method for estimating wear of a tire according to claim 1, wherein the specific frequency range is selected from a range of 10 to 2000 Hz out of frequency components of the tread vibration in the portion outside the contact patch.

4. The method for estimating wear of a tire according to claim 1, wherein the portion outside the contact patch is selected from a range of 30% or less of tire circumferential length along tire circumference from a contact edge.

5. The method for estimating wear of a tire according to claim 1, further comprising:

passing signals outputted from the acceleration sensor through a bandpass filter, the bandpass filter extracting signals in the specific frequency range, and then calculating the tread vibration level of the tread vibration in the portion outside the contact patch from the signals having passed through the bandpass filter.

6. The method for estimating wear of a tire according to claim 1, wherein the tread vibration level in the portion outside the contact patch is corrected using a wheel speed or a tire rotation time.

7. The method for estimating wear of a tire according to claim 1, wherein a degree of wear is estimated only when the tread vibration level in the portion outside the contact patch is within a predetermined range.

8. An apparatus for estimating wear of a tire, comprising:

an acceleration sensor disposed on an inner surface side of a tire tread for detecting a radial acceleration of the tire;

a means for calculating a standardized deformation speed in a radial direction of the tire from the detected radial acceleration of the tire;

a means for calculating a tread vibration level at a specific position and in a specific frequency range from the radial acceleration of the tire, the specific position being in a portion outside a contact patch of the tire tread and the tread vibration level changing with road surface roughness from the detected radial acceleration of the tire;

a means for storing a relation between a relationship between a tread vibration level per degree of tire wear in the portion outside the contact patch if the tire tread and a standardized deformation speed, which are determined in advance;

a means for correcting the calculated standardized deformation speed based on the relationship; and a means for estimating a degree of tire wear based on the corrected standardized deformation speed;

wherein the standardized deformation speed is obtained by standardizing differential peak values, which are a peak value at a contact edge of the tire tread, by rotation time or rotation speed of the tire.

\* \* \* \* \*